(12) United States Patent
May (10) Patent No.: US 8,181,493 B2
(45) Date of Patent: May 22, 2012

(54) POSITION SENSING (75) Inventor: Lutz May, Gelting/Geretsried (DE)

(73) Assignee: NCTEngineering GmbH, Unterhaching (DE)

( * ) Notice: Subject to any disclaimer, the term of this patent is extended or adjusted under 35 U.S.C. 154(b) by 921 days.

(21) Appl. No.: 11/994,607

(22) PCT Filed: Jul. 27, 2006

(86) PCT No.: PCT/EP2006/007454
§ 371 (c)(1),
(2), (4) Date: May 8, 2008

(87) PCT Pub. No.: WO2007/017136
PCT Pub. Date: Feb. 15, 2007

(65) Prior Publication Data
US 2009/0217711 A1 Sep. 3, 2009

Related U.S. Application Data (60) Provisional application No. 60/702,870, filed on Jul. 27, 2005.

(51) Int. Cl.
*D06F 39/00* (2006.01)
*G01R 33/00* (2006.01)
(52) U.S. Cl. .............. 68/12.27; 324/207.2; 324/251; 73/514.31; 73/514.16

(58) Field of Classification Search ........... 68/12.02, 68/12.04, 12.06, 24, 58; 324/251, 207; 73/514.31, 73/514.16, 514.39
See application file for complete search history.

(56) References Cited

U.S. PATENT DOCUMENTS

| 3,665,449 A * | 5/1972 | Elder et al. ............... 340/572.1 |
| 4,803,885 A * | 2/1989 | Nonomura et al. ........ 73/862.333 |
| 5,000,015 A * | 3/1991 | Nakamura et al. ............ 68/23.3 |
| 6,460,381 B1 * | 10/2002 | Yoshida et al. ............. 68/12.04 |
| 6,513,395 B1 * | 2/2003 | Jones ..................... 73/862.333 |
| 2007/0163367 A1 * | 7/2007 | Sherman et al. ............... 73/866 |

FOREIGN PATENT DOCUMENTS

| JP | 8271355 | 10/1996 |
| JP | 2002-148127 | 5/2002 |
| WO | 99/56099 | 11/1999 |
| WO | 02/063262 | 8/2002 |
| WO | 02/068922 | 9/2002 |
| WO | 2005/064281 | 7/2005 |
| WO | 2005/064301 | 7/2005 |
| WO | 2006/082047 | 8/2006 |

* cited by examiner

*Primary Examiner* — Saeed T Chaudhry
(74) *Attorney, Agent, or Firm* — Fay Kaplun & Marcin, LLP (57) ABSTRACT A three-axis linear position sensor apparatus may include (a) a reference device adapted as a magnetic field generating element, (b) a receiver pad adapted to measure a magnetic field generated by the reference device, and (c) a signal-conditioning and signal-processing electronics adapted to determine a three-axis linear position of the reference device based on the magnetic field measured by the receiver pad.

32 Claims, 6 Drawing Sheets

POSITION SENSING

This application claims the benefit of the filing date of U.S. Provisional Patent Application No. 60/702,870 filed Jul. 27, 2005, the disclosure of which is hereby incorporated herein by reference.

FILED OF INVENTION

The present invention relates to a position sensor apparatus, a washing machine and a method of sensing a position.

BACKGROUND INFORMATION

Magnetic transducer technology finds application in the measurement of torque and position. It has been especially developed for the non-contacting measurement of torque in a shaft or any other part being subject to torque or linear motion. A rotating or reciprocating element can be provided with a magnetized region, i.e. a magnetic encoded region, and when the shaft is rotated or reciprocated, such a magnetic encoded region generates a characteristic signal in a magnetic field detector (like a magnetic coil) enabling to determine torque or position of the shaft. Such kind of sensors are disclosed, for instance, in WO 02/063262.

WO 05/064301 discloses another torque sensor based on a magnetic sensor principle and is based on the application of current pulses directly to a shaft, the pulses being defined by a steep raising edge and a slow falling edge.

SUMMARY OF INVENTION

The present invention relates a position sensor apparatus (e.g., a volumetric or three-axis linear sensor), a washing machine, and a method of sensing a position (e.g., volumetric or three-axis linear position).

According to an exemplary embodiment of the invention, a (for instance three-axis linear) position sensor apparatus is provided comprising a reference device adapted as a magnetic field generating element, a receiver pad adapted to measure a magnetic field generated by the reference device, and a (mixed) signal-conditioning and signal-processing electronics adapted to determine a (for instance volumetric or three-axis linear) position of the reference device based on the magnetic field measured by the receiver pad.

According to another exemplary embodiment of the invention, a washing machine is provided comprising a (for instance volumetric or three-axis linear) position sensor apparatus having the above-mentioned features.

According to still another exemplary embodiment of the invention, a method of sensing a (for instance volumetric or three-axis linear) position of a reference device is provided, the method comprising generating a magnetic field by the reference device, measuring, by a receiver pad, the magnetic field generated by the reference device, and determining, by a signal-conditioning and signal-processing electronics, the (for instance volumetric or three-axis linear) position of the reference device based on the magnetic field measured by the receiver pad.

In other words, a sensor according to an exemplary embodiment, may be used for one-dimensional position determination (for instance a one-axis sensor), for two-dimensional position determination (for instance a two-axis sensor), or for three-dimensional position determination (for instance a three-axis or volumetric sensor).

According to an exemplary embodiment of the invention, a volumetric position detector may be provided in which a reference device may be considered as the target the position of which is to be detected or may be connected to an object the position of which is desired. The reference device may generate a permanent or variable magnetic field which can be detected by a receiver pad which comprise a substrate (like a PCB, printed circuit board) on/in which a plurality of magnetic sensing coils may be integrated. By providing a plurality of (for instance symmetrically arranged) coils in the receiver pad, multiple sensor signals may be detected and evaluated together, and the correlation between the individual signals may provide further information.

For example, triangulation methods or the like may be applied for determining a position distance between the reference device and individual ones of the coils of the receiver pad. A processing circuit, which may also be denoted as a (mixed) signal conditioning and signal processing electronics may then evaluate or analyze the detection signals received by the coils of the receiver pad, thereby deriving a position of the reference device along all three spatial directions, X, Y and Z in a Cartesian coordinate system.

For determining n=3 coordinates of the reference device, it may be possible to provide m>n sensing coils in the receiver pad (for instance m=4) to thereby improve accuracy.

Therefore, a highly accurate contactless position sensor device for deriving a three-dimensional position may be provided, which may allow to quickly, securely and accurately measure the position of a (movable) reference device even under harsh conditions, like in the presence of oil or water.

Next, further exemplary embodiments of the sensor apparatus will be explained. However, these embodiments also apply to the washing machine and to method.

The sensor apparatus may comprise a user input/output interface adapted to enable a user to operate the sensor apparatus. Such a user input/outpace interface may comprise a plurality of interfaces for connecting various apparatuses, like a computer or the like. The user input/output interface may also provide an output unit, that is to say some kind of display which may be an LCD, a TFT or a plasma display device. Furthermore, input units like a joystick, a keypad, one or more buttons, or even a microphone of a voice recognition system may be provided.

The sensor apparatus may be adapted for industrial or automotive applications. For instance, the sensor apparatus may be adapted for being implemented in a washing machine to determine a position (for example indicative of a weight load of clothes put therein) of a drum rotatably mounted in the washing machine. It is also possible to measure the three-dimensional position of a shaft of an engine, a reciprocating rod, or the like.

The reference device may comprise a magnetic field generating coil. Such a magnetic field generating coil may be fed with an exciting electric signal, like a current or a voltage, AC or DC, so as to generate a specified magnetic field. By modifying or modulating amplitude and/or frequency of the exciting signal, more generally by adjusting the time behaviour of the generated magnetic field, an adaptation of the excited magnetic field to specific frame conditions may be made possible.

For example, the magnetic field generating coil may be a spherically wound coil, that is to say a coil made of an electrically conductive wire which is wound with essentially parallel windings around a spherical body. Such a spherically wound coil may be less prone to failure or inaccuracy which may occur in case of an undesired tilting between a coil axis and a vector oriented perpendicularly to a plane indicating a surface of the receiver pad. Therefore, with such a spherically wound coil, the operation of the sensor apparatus may be improved.

The reference device may also comprise a permanent magnetic region, for instance of a rotationally symmetric shape, like a spherical permanent magnetic element. The term "permanent magnetic" may refer to a magnetized material which has a remaining magnetization also in the absence of an external magnetic field. Thus, "permanent magnetic materials" may include ferromagnetic materials, ferrimagnetic materials, or the like. The material of such a magnetic region may be a 3d-ferromagnetic metal like iron, nickel or cobalt, or may be a rare earth material ("4f-magnetism").

The reference device may also comprise a longitudinally magnetized region of a magnetizable object. Thus, the magnetizing direction of the magnetically encoded region or the magnetic field source may be oriented parallel to a surface of the object. A method of manufacturing such a longitudinally magnetized region on a magnetizable material from which the reference device may be manufactured according to the described embodiment, is disclosed, in a different context, in WO 2002/063262 A1.

Alternatively, the reference device may comprise a circumferentially magnetized region of a magnetizable object. Such a circumferentially magnetized region may particularly be adapted such that a magnetic field source (which may also be denoted as the magnetically encoded region) is formed by a first magnetic flow region oriented in a first direction and by a second magnetic flow region oriented in a second direction, wherein the first direction is opposite to the second direction.

In a cross-sectional view of the magnetizable object, there may be a first circular magnetic flow having a first direction and a first radius and a second circular magnetic flow having a second direction and a second radius, wherein the first radius is larger than the second radius. Particularly, the magnetic field source may be manufactured in accordance with the manufacturing steps of applying a first current pulse to a magnetizable object, wherein the first current pulse is applied such that there is a first current flow in a first direction along a longitudinal axis of the magnetizable element, and wherein the first current pulse is such that the application of the current pulse generates a magnetic field source in a core of the magnetizable object. Moreover, a second current pulse may be applied to the magnetizable element, wherein the second current pulse may be applied such that there is a second current flow in a second direction along the longitudinal axis of the magnetizable element. The first direction may be anti-parallel to the second direction. In other words, the first direction may be opposite to the second direction.

Furthermore, the first and second current pulses may have a raising edge and a falling edge, wherein the raising edge may be steeper than the falling edge (see for instance FIGS. 28 and 30 of WO 05/064301).

The receiver pad may comprise a plurality of magnetic field detection units. Particularly, any of these magnetic field detection units may be a coil, a Hall-effect probe, a Giant Magnetic Resonance magnetic field sensor, or a Magnetic Resonance magnetic field sensor. However, any magnetic field detector may be used to detect a signal indicative of the distance to the transmitting reference device.

The receiver pad may comprise a plurality of tiltable coils, that is coils being tiltable with regard to a planar surface of the receiver pad. In a case in which an undesired tilting between the receiver pad and the reference device occurs, which event may deteriorate the accuracy significantly, tilting of one or more coils of the receiver pad may compensate for such an effect. Therefore, by foreseeing the receiver pad with tiltable coils, a flexible adjustment mechanism may be provided to suppress signal deterioration mechanisms.

The receiver pad may comprise a plurality of coils having a non-concentric winding, that is different windings wound around different centers. For example, different windings of a coil may have centers which are located along a (linear or curved) line. It is also possible that any other asymmetry is selectively introduced in the coil winding scheme, like a spiral winding, or two eccentric multiple winding portions each having concentric windings, wherein one of such portions may be located within another one of such portions, but having different centers.

The receiver pad may comprise four coils having centers arranged on corners of a square. Such a configuration may be completely symmetric with regard to a center of the square, thereby having a symmetric geometry and four detection signals which, in combination, may allow to determine the three-dimensional position of the device with high accuracy.

The signal-conditioning and signal-processing electronics may be coupled to the reference device and/or to the receiver pad in a wireless or wired manner. A wired connection (using cables) may be a very secure and failure resistant solution, whereas a wireless solution (using transmission of electromagnetic signals, for instance in the IR or RF domain) may increase the flexibility and may extend possible applications of the sensor apparatus to technical fields or environments in which no wired connection between the different components is possible.

The signal-conditioning and signal-processing electronics may be operable in a first operation mode sensitive to a first volumetric space with a first value of sensitivity and may be operable in a second operation mode sensitive to a second volumetric space with a second value of sensitivity, wherein the first volumetric space is larger than the second volumetric space and the first value of sensitivity is smaller than the second value of sensitivity. The first operation mode has the advantage that position in a large volume may be detected, and the time for measuring and evaluating may be kept very short. On the other hand, if a very high accuracy is desired, the volumetric space under consideration may be reduced, and the processing may be simultaneously refined, so that the sensitivity of the detection may be increased. This two operation mode configuration may be extended or refined to a three or more operation mode configuration, in accordance with the requirements of a specific application.

The receiver pad, the signal-conditioning and signal-processing electronics, and the user input/output interface may be integrated in a common or shared casing. This may simplify handling of the sensor apparatus, since a plurality of the components may be combined to a single component.

The receiver pad and the reference device may be positioned parallel to one another. By guaranteeing that a coil axis of the reference device and an axis perpendicular to a surface plane of the receiver pad are parallel to one another, it may be ensured that the accuracy of the detection is high, since tilting may have undesired effects.

An off range indicator of the sensor apparatus may be adapted to indicate an operation state in which the reference device is placed outside of a predetermined measurement spacing. Therefore, a user may be alarmed or informed about the fact that, in a present configuration, the sensor apparatus may be incapable of accurately measuring the three-dimensional position of the reference device, since it is out of a predetermined measurement range.

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

DETAILED DESCRIPTION

The illustration in the drawing is schematically. In different drawings, similar or identical elements are provided with the same reference signs.

In the following, referring to FIG. 1 and FIG. 2, a three-axis linear position sensor apparatus 100 according to an exemplary embodiment of the invention will be explained.

The three-axis linear position sensor 100 is adapted for consumer, industrial and automotive applications. It may provide a complete sensor system for non-contact measurement of three-axis movement in an environment with high EMI (electromagnetic interferences).

Figure 1:
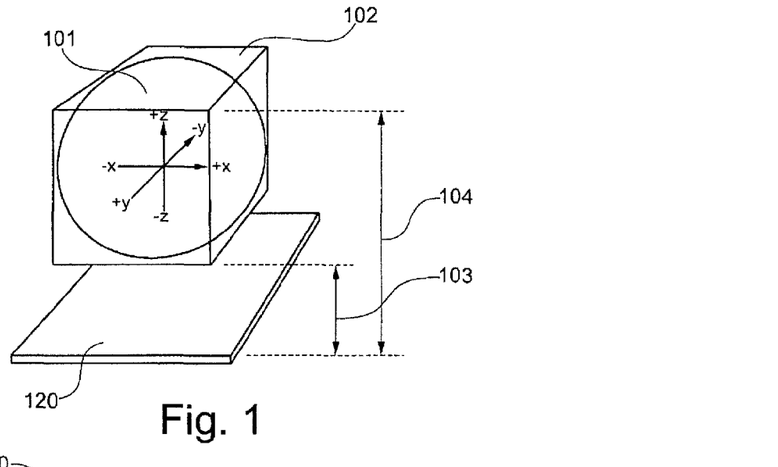
FIG. 1 to FIG. 16 illustrate sensor apparatuses, components thereof, and diagrams describing the structure and the function of sensor apparatuses according to exemplary embodiments of the invention.
Figure 2:
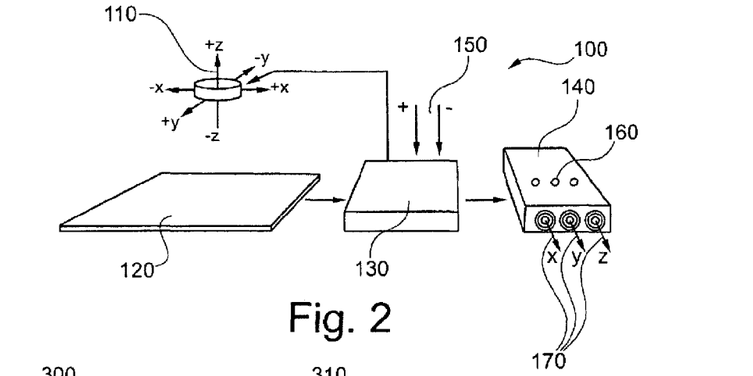

The apparatus shown in FIG. 1 and in FIG. 2 is a three-axis position sensor providing three analog signal outputs. A non-contact operation is possible. The measurement range is relatively large, for instance 64 mm×64 mm×64 mm. The measurement principle may function also in water and oil environment. The operating temperature range is wide, and the current consumption is low.

Table 1 provides information with regard to a technical specification of the three-axis linear position sensor 100 shown in FIG. 1 and FIG. 2. If it is not specified otherwise, the here listed specifications are valid for operating temperature of 25° C.

TABLE 1

| Specification | Explanation | Value | Unit |
|---|---|---|---|
| Measurement Range | For each axis: X, Y, and Z | +/−32 | mm |
| Output Signal Range | For each axis: X, Y, and Z | 0.2 to 4.8 | V |
| "Zero" Position Signal | For each axis: X, Y, and Z; Ratiometric | 2,500 | V |
| Maximal Spacing between Reference Device and Receiver Pad | | 160 | mm |
| Single Supply Voltage | | +14 to +19 | V |
| Total Electrical Current Consumption | Under Typical Conditions; Not Considering any Output Signal Load | 80 | mA |
| Analog Output Signal Resolution | Under Typical Operating Conditions | 5 | mV |
| Measurement Resolution | Typical value for X, Y, and Z | 60 | μm |
| Measurements per Second | For each axis: X, Y, and Z | 300 | Samples/Sec |
| Operating Temperature Range | | 0 to +70 | ° C. |

In the following, the sensor apparatus 100 will be explained in more detail.

The sensor system 100 is measuring and defining the location of a reference device 110 (a small electrical coil) within the physical spacing of three measurement axis X, Y and Z.

The output signals for the three axes are analog voltages. The reference device 110 can be placed in a harsh environment like water or oil. The 3D linear position sensor 100 can be used in an environment with relative high magnetic/electromagnetic interferences and is therefore, for example, ideal for use in washing machine applications, in mining, in automotive applications, etc.

The sensor apparatus 100 comprises particularly four functional modules, namely the reference device 110 (or transmitter), a receiver pad 120, a mixed signal conditioning and signal processing electronics 130 and a user input/output device 140. The reference device 110 may be permanently fixed (mounted) at an object (like a rotating drum of a washing machine) that will move within the detection spacing of the 3D linear position sensor 100.

The object with the attached reference device 110 can move in any of the three measurement axes (X, Y and Z) as long as the reference device 110 is within a specified measurement spacing. FIG. 1 indicates a low signal error measurement spacing ($L_{LSE}$) 101, a standard measurement spacing ($L_S$) 102, a minimum measurement distance ($RP_{min}$) 103 and a maximal measurement distance ($RP_{max}$) 104.

The reference device 110 and the receiver pad 120 are connected to the SCSP electronics 130 (having for instance two wires for connection to the reference device 110 and up to 8 wires for connection to the receiver pad 120). However, a wireless solution is possible as well. In this case, a unidirectional or bidirectional communication between the individual components 110, 120, 130 is enabled for instance using wireless transmitters/receivers like RFID tags and corresponding reader/writer base stations. In the interest of low signal noise, the electric wiring may be kept relatively short.

Still referring to FIG. 2, a signal supply voltage unit 150 is foreseen to supply the SCSP electronics 130 with electrical energy. Furthermore, function indicators 160 (for example LEDs) are foreseen at the user I/O device 140, and the three analog signal outputs 170 are indicated as well in FIG. 2.

The three function modules 120, 130, 140, namely the receiver pad 120, the SCSP electronics 130 and the user I/O 140 can be integrated in one unit.

In the following, physical dimensions and measurement ranges will be discussed referring to Table 2. If not specified otherwise, all values shown are "typical" and valid for room temperature of 21° C.

TABLE 2

| Specification | Symbol | Explanation | Value | Unit |
|---|---|---|---|---|
| X-Axis Measurement Range | $L_{S-X}$ | | +/−32 | mm |
| Y-Axis Measurement Range | $L_{S-Y}$ | | +/−32 | mm |
| Z-Axis Measurement Range | $L_{S-Z}$ | | +/−32 | mm |
| X-Axis Low-Signal-Error Range | $L_{LSE-X}$ | | +/−20 | mm |
| X-Axis Low-Signal-Error Range | $L_{LSE-Y}$ | | +/−20 | mm |
| X-Axis Low-Signal-Error Range | $L_{LSE-Z}$ | | +/−25 | mm |
| Minimum Spacing RD to RP | $RR_{Min}$ | | 100 | mm |
| Maximum Spacing RD to RP | $RR_{Max}$ | | 164 | mm |
| Analog Output Signal Range | $OUT_{AR}$ | For X, Y, and Z Axis | +0.2 to +4.8 | V |
| Analog Output Signal Zero Point | $OUT_{AZ}$ | For X, Y, and Z Axis | 2.500 | V |
| Standard Signal Resolution | $OUT_{SSR}$ | For X, Y, and Z Axis | 5 | mV |

TABLE 2-continued

| Specification | Symbol | Explanation | Value | Unit |
|---|---|---|---|---|
| High Signal Resolution | $OUT_{HSR}$ | Optional: One Axis Only (Example: Z-Axis) | 1.25 | mV |
| Standard Samples per Second | | For X, Y, and Z Axis | 300 | SampS |
| High Resolution Samples/Sec | | Optional: One Axis Only (Example: Z-Axis) | 1 | Samp/S |

One embodiment of the "three-axis linear position sensor" apparatus 100 provides three analog signal outputs (BNC connectors) that may be updated 300 times per second (sampling rate 300/s). When the reference device 110 is placed in the center of the measurement cube, the output signal is 2.5 V for each of the three axes.

The output signal may perform "monotonic" and may have the higher security near the center of the specified measurement range. The areas near the "corners" of the specified measurement spacing (measurement cube) may have a higher measurement error.

Figure 3:
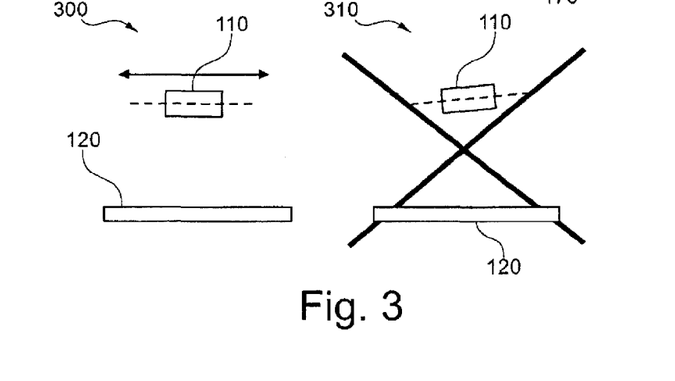

To obtain a correct measurement result, the reference device 110 should be in parallel position to the receiver pad 120, as indicated in an illustration 300 shown in FIG. 3. When tilting the reference device 110 in relation to the receiver pad 120, the output signals will show incorrect values, as indicated by an illustration 310 shown in FIG. 3. The more the reference device 110 is tilted, the larger the measurement errors will be.

However, the effect described referring to FIG. 3 may also be used for measuring a tilting angle of the reference device 110 in relation to the receiver pad 120. When provision is made that a motion of the reference device 110 relative to the receiver pad 120 is prevented in x- and y-direction, a signal modification in response to a tilting of the reference device 110 in relation to the receiver pad 120 may be measured and may be used to detect such a tilting qualitatively or quantitatively.

In other words, referring to FIG. 3, tilting shall be suppressed for measuring the one-dimensional, two-dimensional or three-dimensional position. Positional motion shall be suppressed for measuring the tilting.

In a power-on sequence of the apparatus 100, when switching on the device 100, the system may go into a calibration mode. During the sequence, the electronics 130 may optimize the filter and signal gain stages. After the completion of the calibration sequence, the system 100 will begin with the measurement of the X, Y and Z position.

In the following, an out of range indicator feature will be explained. When the reference device 110 is placed outside of the specified measurement spacing, a "red" light indicator 160 may be "on/active". To turn off the "red" indicator 160, the reference device 110 has to be moved back inside the specified measurement spacing.

According to a power indicator feature, when the apparatus 100 is switched on, a "green" light indicator 160 may be "on/active". The "green" light is in the "off" mode when the sensor system 100 is switched off (or disconnected from the single power supply voltage 150).

In the following, an exemplary embodiment of the invention will be described referring to FIG. 4.

When circling the reference device 110 about the center of the receiver pad 120 (see illustration 400 in FIG. 4), the analog output signals of the X and Y axis show a sine wave similar curve, wherein the signal from X and Y may have a 90° phase shift between each other. This is indicated in an illustration 410 of FIG. 4. In the illustration 410, the analog output signals for X, Y and Z direction are shown.

Figure 4:
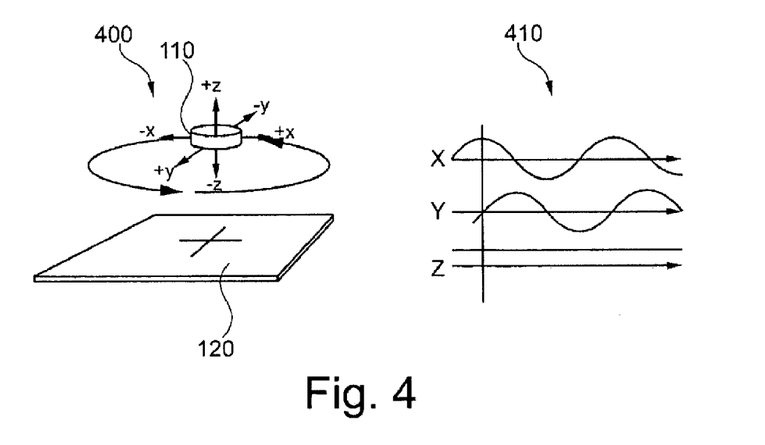

The configuration of FIG. 4 is appropriate for a contactless measurement even under harsh conditions like dirt or oil. For instance, a position of a ball bearing may be determined.

As the reference device 110 is circling about the receiver pad 120 at a constant distance, the output signal in Z direction may be a constant voltage.

When the reference device 110 is mounted (permanently fixed) at the side of an outer washing machine drum casing (not shown in the figures) and the receiver pad 120 is placed parallel to the reference device 110 so that the reference device 110 is now in the center of the specified 3D sensor measurement range, the 3D linear position sensor 100 will now follow every movement of the outer washing machine drum casing. The sample rate of 300 measurements per second allows to follow the drum movements up to 1800 rpm accurately.

The measurement system 100 may be used for laboratory (indoor) use. The system may also be configured and validated to be used in life important, or life supporting applications.

The system 100 can also be adapted for a specific high resolution mode. Such an embodiment may have three analog signal outputs. It is also possible to have a serial digital I/O interface (for instance RS232c). Such an apparatus may be operated in a two-mode operation, with 300 samples per second standby mode, and in a high resolution mode.

A technical specification for such an embodiment is shown in Table 3, wherein if not specified otherwise, the specifications of Table 3 are valid for operating temperature of 25° C.

TABLE 3

| Specification | Explanation | Value | Unit |
|---|---|---|---|
| Measurement Range | For each axis: X, Y, and Z | +/−32 | mm |
| Analog Output Signal | For each axis: X, Y, and Z | 0.2 to 4.8 | V |
| "Zero" Position Signal | For each axis: X, Y, and Z; Ratiometric | 2,500 | V |
| Serial Digital I/O Interface | | Serial | RS232c |
| Maximal Spacing between Reference Device and Receiver Pad | | 160 | mm |
| Single Supply Voltage | | +14 to +19 | V |
| Total Electrical Current Consumption | Under Typical Conditions; Not Considering any Output Signal Load | 80 | mA |
| Analog Output Signal Resolution | Under Typical Operating Conditions | 5 | MV |
| Measurement Resolution | Typical value for X, Y, and Z | 60 | um |
| Measurements per Second Standard Operation | For each axis: X, Y, and Z | 300 | Samples/Sec |
| Measurements per Second High Resolution Mode | For one axis only | 1 | Sample/Sec |
| Operating Temperature Range | | 0 to +70 | ° C. |

Such an embodiment of a sensor system 100 may be placed in water and oil when the reference device 110 has been placed in a waterproof housing.

Physical dimensions and measurement ranges are available from Table 4. Again, if not specified otherwise, all values shown are typical and valid for room temperature of 21° C.

TABLE 4

| Specification | Symbol | Explanation | Value | Unit |
|---|---|---|---|---|
| X-Axis Measurement Range | $L_{S-X}$ | | +/−32 | Mm |
| Y-Axis Measurement Range | $L_{S-Y}$ | | +/−32 | Mm |
| Z-Axis Measurement Range | $L_{S-Z}$ | | +/−32 | Mm |
| X-Axis Low-Signal-Error Range | $L_{LSE-X}$ | | +/−20 | Mm |
| X-Axis Low-Signal-Error Range | $L_{LSE-Y}$ | | +/−20 | Mm |
| X-Axis Low-Signal-Error Range | $L_{LSE-Z}$ | | +/−25 | Mm |
| Minimum Spacing RD to RP | $RR_{Min}$ | | 100 | Mm |
| Maximum Spacing RD to RP | $RR_{Max}$ | | 164 | Mm |
| Analog Output Signal Range | $OUT_{AR}$ | For X, Y, and Z Axis | +0.2 to +4.8 | V |
| Analog Output Signal Zero Point | $OUT_{AZ}$ | For X, Y, and Z Axis | 2.500 | V |
| Standard Signal Resolution | $OUT_{SSR}$ | For X, Y, and Z Axis | 5 | MV |
| High Signal Resolution | $OUT_{HSR}$ | One Axis Only (Example: Z-Axis) | 1.25 | MV |
| Digital I/O Interface | $I/O_{SERIAL}$ | | Serial (Tx, Rx) | RS232c |
| Standard Samples per Second | | For X, Y, and Z Axis | 300 | Samp/S |
| High Resolution Samples/Sec | | One Axis Only (Example: Z-Axis) | 1 | Samp/S |

The described high resolution embodiment of the sensor apparatus 100 may provide analog signal outputs (BNC connectors) that are updated 300 times per second (sampling rate 300/s), as well as one serial I/O digital interface. When the reference device 110 is placed in the center of the measurement cube, the output signal is 2.5 V for each of the three axes. The embodiment 100 includes a measurement protocol that sends the measurement results for each axis (X, Y and Z) through the digital serial RS 232c interface.

The output signals of all three measurement axes may perform "monotonic" and may have a high security near the center of the specified measurement range. The axes near the corners of the specified measurement spacing (measurement cube) may have the higher measurement errors.

Due to the issue as described above referring to FIG. 3, even when the reference device 110 is tilted in relation to the receiver pad 120, the measurement signals will still be monotonic and are useful in a digitally controlled "dampening" application (example: washing machine).

In the following, a power-on sequence of the explained embodiment will be described.

When switching on the sensor device 100, the system may go into an optional calibration mode. During the sequence, the electronics may optimize the filter and signal gain stages for each of the four independent working measurement channels. After the completion of the calibration sequence, the system may begin with the measurement of the X, Y and Z position. It may be therefore advisable that after moving the reference device 110 and the receiver pad 120 into a new measurement location (new measurement setup) to switch off, and to restart the sensor system 100 so that the calibration sequence may be initiated.

In the following, an application example of the high resolution sensor device 100 will be explained.

A standard operation mode may be carried out in a similar manner as described above referring to FIG. 4.

However, in a high resolution mode, it may be assumed that the 3D linear measurement system 100 is used in static operation. In the example of a washing machine this would mean that the drum is not operating.

Instead of providing 300 measurement samples per second, the system may perform a much more accurate signal computation and may provide a measurement for a specific channel every second. In this mode even very small movements in the mm-range can be detected and will be passed on to the analog and/or serial digital signal output.

This measurement mode is specified to measure the weight (load) changes in the washing machine drum, for example.

In the following, a position definition sequence will be explained.

1. Identifying X-position (spacing between receiver coils 120 and reference coil 110).
2. First error corrections (using a Look-up table).
3. Based on the assumed X-position, choosing of the most accurate ZY-position formula.
4. Identifying YZ-position (for example by triangulation).
5. Second error correction of X-position based on how far from the center the reference coil 110 is placed.
6. Identifying rotation frequency rpm (drum rotations per time).
7. If rpm is low, that is to say is below a threshold value, then continuing with error correction for ZY-position (using a Look-up table).

Next, signal bandwidth and system accuracy will be explained.

At a high rpm, that is to say above a threshold value, the washing machine drum makes essentially only small movements. At low rpm, the washing machine drum may make larger movements.

This may have the following consequences:

1. At high rpm, the software has to focus only in the center of the 3D measurement space and with this simplifying the software calculations (not much calculation time available anywhere).
2. At low rpm (when the drum will make larger movements) more calculation time may be available for the correction of the position values.

In the following, the receiver coil 110 design will be explained in more detail.

To achieve a linear output signal (when summing up the values of all four receiver coils) the spacing between the coils should be larger when the reference coil 110 is further away. At close range (between receiver coils and reference coil 110), the spacing between the receiver coils may be smaller.

Figure 5:
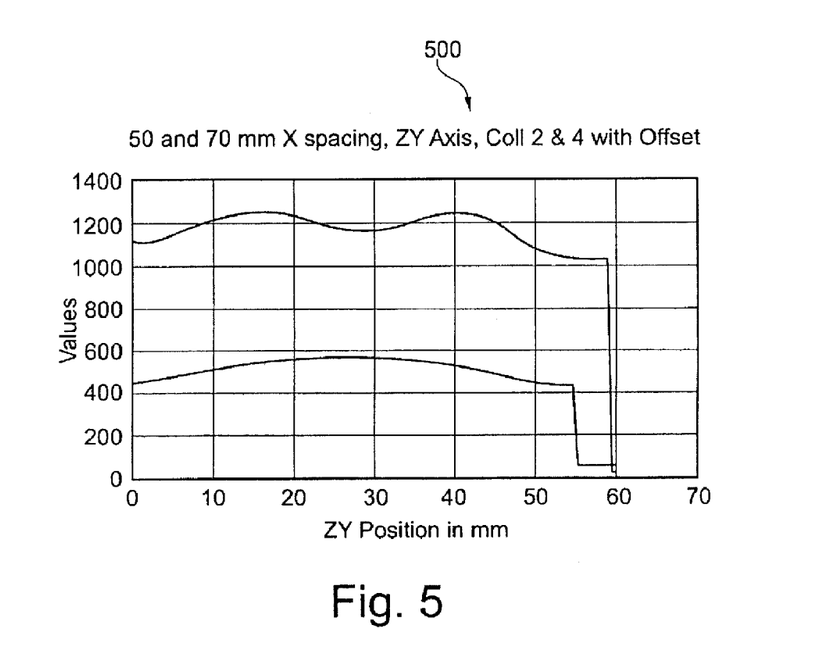

FIG. 5 shows a diagram 500 illustrating a correlation between the measurement values and different ZY-positions.

Some results of these considerations are:

1. An option 1 is to tilt the receiver coils "outward" meaning that the receiver coils are higher towards the center of the receiver pad 120).
2. Alternatively, the coil design may be changed to achieve a similar effect (option 2).

Figure 6:
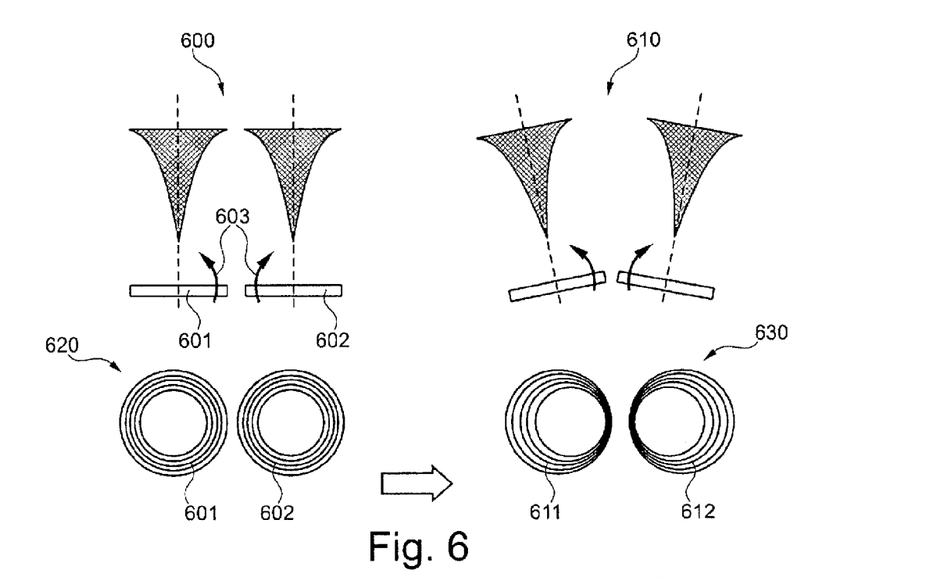
Figure 7:
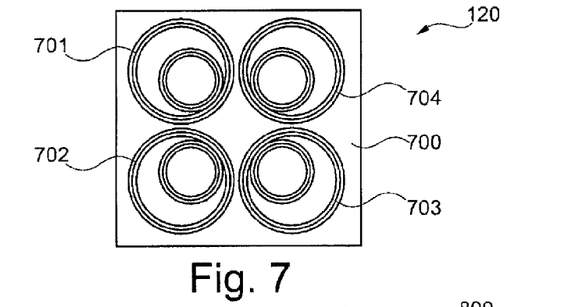

FIG. 6 and FIG. 7 show embodiments for these two options 1 and 2.

FIG. 6 shows an illustration 600 in which two receiver coils 601, 602 are shown in a side view and are oriented in parallel. By tilting them around along arrows 603, a tilted configuration 610 is obtained (option 1).

Another embodiment is shown in an illustration 620 and in an illustration 630. The illustration 620 shows ordinary coils 601, 602 with concentric windings. However, as shown in illustration 630, non-symmetric receiver coils 611, 612 are illustrated to improve X-axis measurement linearity. The windings of the coils 611, 612 are non-concentric, and the centers of the windings may be positioned along a straight line in horizontal direction of FIG. 6 (option 2).

FIG. 7 shows a receiver pad 120 comprising a substrate 700 and four asymmetrically wound coils 701 to 704, wherein centers of their respective outer windings are arranged on corners of a square. Centers of their respective inner windings are arranged on corners of a smaller square. Thus, FIG. 7 is a simplified design for wound coils or PCB pancake coil designs (also an embodiment for option 2).

Still referring to FIG. 7, instead of the three-dimensional position measurement configuration shown there, only two of the coils (for example coils 702, 703) are sufficient for measuring a two-dimensional position, and only one of the coils (for example coil 702) is sufficient for measuring a one-dimensional position.

Next, an absolute measurement range of the sensor array 100 will be discussed.

In a practical system design, it may be possible to have difficulties to cover the entire 62 mm×62 mm×62 mm measurement range. Further design changes are needed to achieve this volumetric spacing range. Exemplary available options to enlarge the 3D spacings or to improve accuracy are:

1. Adjust physical dimensions of the receiver coils 701 to 704.
2. Adjust physical dimensions of the reference coil 110.
3. Adjust physical spacing between receiver coils 701 to 704.
4. Adjust inductivity (number of wire turns) of receiver coils 701 to 704.
5. Adjust inductivity (number of wire turns) of reference coil 110.
6. Use or omit ferromagnetic core in any one of coils 110, 701 to 704.
7. Adaptive changing or adaptation of reference coil 110 driver signal amplitude.
8. Adaptive changing of reference coil 110 signal frequency (when being operated in an AC mode).
9. Improving or optimizing the number of receiver coils 701 to 704 (one, two, three, four, or more) and the geometry according to which they are arranged to each other.
10. Improving or optimizing the receiver coil 701 to 703 coil layout/design.

Figure 8:
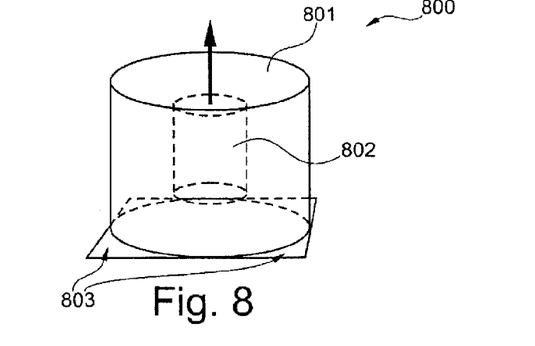

FIG. 8 shows an illustration 800 in which different areas of a measurement are shown.

A typical movement area of a washing machine drum is indicated by reference numeral 801. As indicated with reference numeral 802, a high precision measurement area is shown when the drum is not moving. Furthermore, a location is shown of the drum at high rpm.

As indicated with reference numeral 803, it may be dispensable to improve or optimize 3D position sensor calculations for the corner areas.

Figure 9:
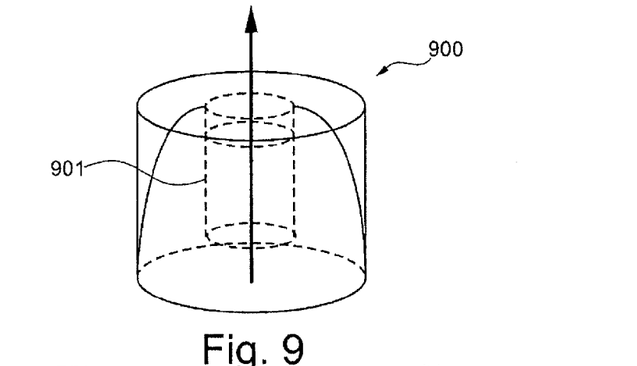

As can be taken from the illustration 900 in FIG. 9, for an embodiment of a software tool, a realistic measurement range with acceptable accuracy is indicated by reference numeral 901.

It can be assumed that the reference coil 110, attached to the washing machine drum, will not reach the corner areas of FIG. 8.

Figure 10:
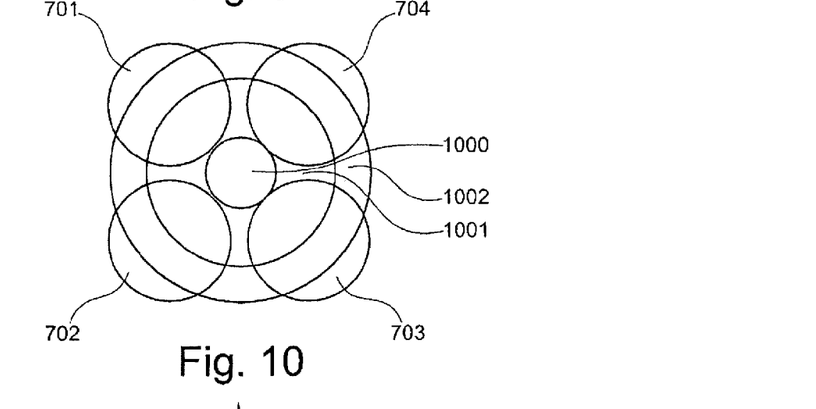

Now referring to FIG. 10, the receiver coils 701 to 704 are shown again. Furthermore, a precision measurement area 1000 is shown. Beyond this, an area 1001 is shown in which a sufficiently accurate measurement is possible. An area 1002 still allows a measurement, however with reduced accuracy.

Figure 11:
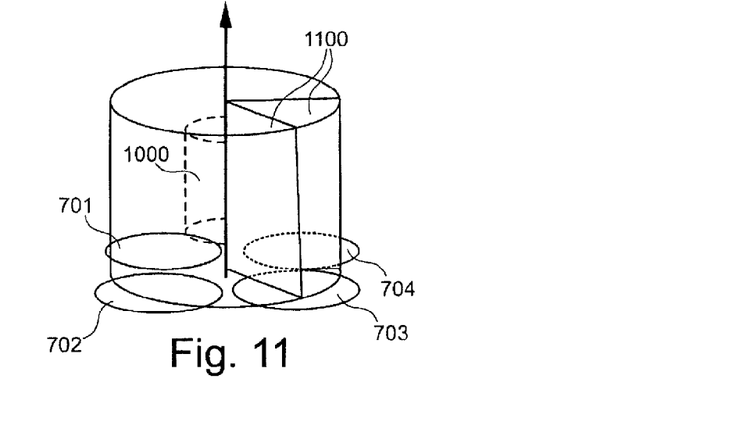

FIG. 11 indicates an error correction, implementing a Look-up table design. As can be taken from a reference numeral 1100, two 2D look-up tables may represent a minimum requirement for sufficient ZY error correction.

With regard to an advantageous sensor design, results show that:

1. A smaller reference coil may reduce or eliminate "curve bouncing" (no measurement dead zones).
2. A four receiver coil design may give larger, uniform measurement space than a three receiver coil design.

Figure 12:
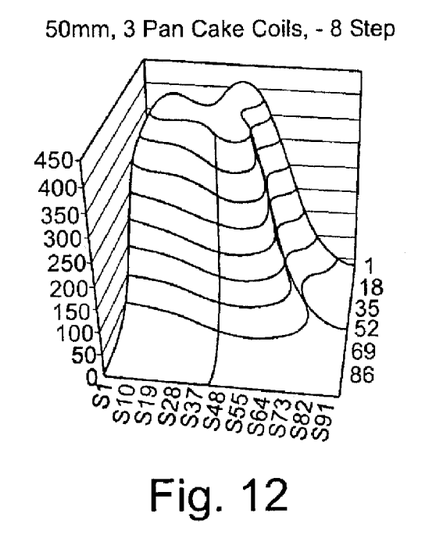
Figure 13:
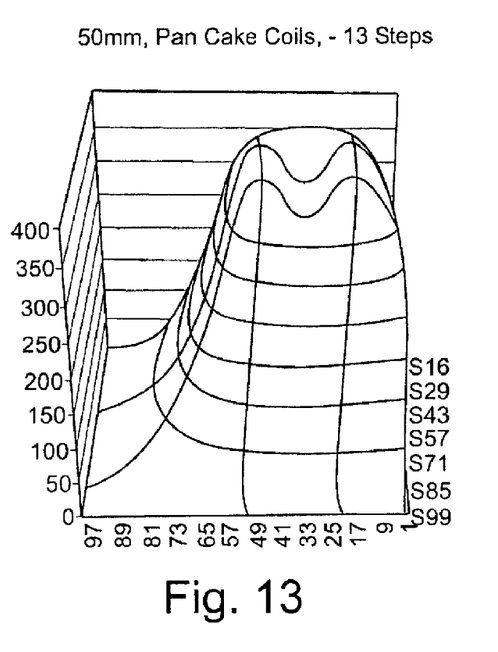

FIG. 12 and FIG. 13 illustrate different pancake coil configurations.

Regarding the number of provided pancake coils, it may be noted that also, as already shown with the above simulations, three coils may be sufficient. Even if, for example, only a measurement regarding the Z-axis is desired, one pancake coil may be sufficient. If a measurement regarding the Z-axis and another axis desired, two pancake coils may be sufficient. If a three-dimensional measurement is desired, three pancake coils arranged in the corners of a pyramid may be sufficient. The pyramid-like arrangement of three pancake coils is believed to allow for a complete three-dimensional measurement. For facilitating the mathematical analysis of the measurement, four pancake coils may be arranged, each of the four pancake coils being arranged in the corners of a square. This arrangement with the four pancake coils arranged in the corners of the square may allow for a very simple mathematical analysis of the respective signals output by the respective pancake coils.

For the overall design and arrangement of the coils and the sensor as well as for the reference sensor arrangement, a size of the sensor and of the pancake coils may be in correlation and should be contemplated for the design of the sensor as well as for the pancake coils.

Regarding the reference sensor 110, it should be noted that the reference sensor 110 coil may be arranged as far as possible in one dimension. From this point of view, a one-dimensional coil may be preferable. However, such a coil may be successible to a malpositioning of the coil. For example, a tilting of such a one-dimensional coil may lead to inaccurate measurement results. However, it is believed that a one-dimensional coil may allow for a very accurate reference sensor.

In order to avoid or suppress inaccuracies due to the tilting of the reference sensor 110, the reference sensor 110 may be a coil having the form of a sphere. Such a coil 110 may be formed by rolling a conductor such as a wire around a sphere. If such a coil arrangement as reference sensor tilts a few degrees, a small portion of the coil is tilted to the one side, whereas the other corresponding portion of the coil is tilted to the other side, which may allow for a compensation of the tilting, even for an automatic compensation of such a positioning inaccuracy. This may allow for a reference coil sensor, which may be relatively insensitive with respect to a tilting of the reference coil 110 and/or with respect to the orientation and local arrangement of the reference coil 110.

Advantageously, the sensor arrangement described above may allow for a measurement of up to five degrees of freedom in the three-dimensional space. It may be the case that a rotation around the Z-axis may be discernable only with difficulties or slightly reduced accuracy. However, any rolling or pitching movements may be recognized. The Z-axis is the normal on the measurement coil(s).

According to an exemplary embodiment, a three-axis linear position sensor for consumer, industrial or automotive applications may be provided, comprising a reference device, a receiver pad, a mixed signal conditioning and signal processing electronics and a user input/output interface.

The transmitter or reference device may emit sine pulses, and may therefore be connected to an oscillator. The sine pulses may have a frequency of 10 kHz which frequency is believed to be not occupied by other communication systems. An even higher frequency may be desired from the radio frequency transmission quality point of view.

Figure 14:
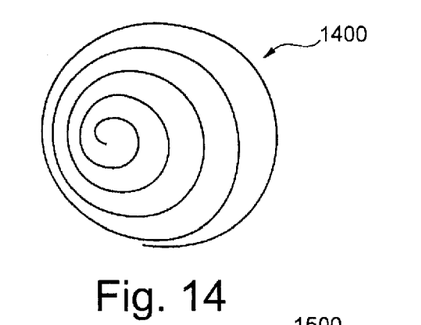

FIG. 14 shows a further embodiment for a receiver coil 1400 which is formed as an asymmetric winding of an electrically conductive wire.

The detector coil 1400 may be used as a sensing coil of the receiver pad 120 and is shaped like a distorted spiral with a center of the different windings being shifted (in an outwardly pointing direction) from winding to winding from the left side of FIG. 14 to the right side of FIG. 14.

Figure 15:
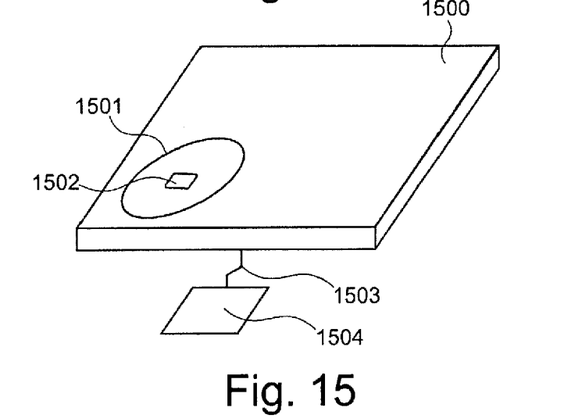

FIG. 15 shows a further embodiment of a receiver pad 1500 having a schematically illustrated detection coil 1501 and a pre-amplifier 1502. Further coils 1501 (for instance altogether four) may be provided on the receiver pad 1500, but are not shown in FIG. 15. A wired connection 1503 (which, alternatively, may be wireless) connects the receiver pad 1500 to an electronics block 1504.

Therefore, the electronics block 1504 and the receiver pad 1500 may be provided on separate substrates (like PCBs).

Figure 16:
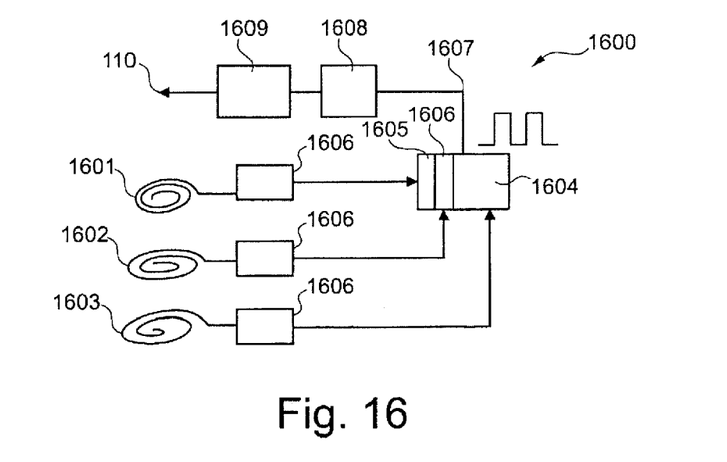

FIG. 16 shows an exemplary embodiment of the SCSP electronics 1600.

A connection to a reference coil is indicated with reference numeral 110. Connections to receiver coils of a receiver pad are denoted with reference numerals 1601 to 1603. A microprocessor unit is denoted with reference numeral 1604, wherein a multiplexer function 1605 and/or an ADC function 1606 may be foreseen.

The signals of the receiver coils 1601 to 1603 are sent to pre-processing blocks 1606 which may include a pre-amplifier function and/or a filter function.

An oscillator signal may be sent via a line 1607 to a filter 1608 and to an amplifier 1609 before being supplied to the receiver coil 110.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

The invention claimed is:

1. A position sensor apparatus, comprising: a reference device including a magnetic field generating element; a receiver pad measuring a magnetic field generated by the reference device; and a signal-conditioning and signal-processing electronics determining a position of the reference device as a function of the magnetic field, wherein the electronics is operable in (a) a first operation mode in which the electronics is sensitive to a first volumetric space with a first sensitivity and (b) a second operation mode in which the electronics is sensitive to a second volumetric space with a second sensitivity, and wherein the first volumetric space is larger than the second volumetric space, the first sensitivity being smaller than the second sensitivity.

2. The sensor apparatus of claim 1, further comprising: a user input/output interface enabling a user to operate the sensor apparatus.

3. The sensor apparatus of claim 2, wherein the receiver pad, the electronics and the user input/output interface are situated in a common casing.

4. The sensor apparatus of claim 1, wherein the sensor is adapted for one of a consumer industrial application and an automotive application.

5. The sensor apparatus of claim 1, wherein the reference device includes a magnetic field generating coil.

6. The sensor apparatus of claim 1, wherein the magnetic field generating coil is a spherically wound coil.

7. The sensor apparatus of claim 5, wherein the reference device includes a permanent magnetic element.

8. The sensor apparatus of claim 1, wherein the reference device includes a longitudinally magnetized region of a magnetizable object.

9. The sensor apparatus of claim 1, wherein the reference device includes a circumferentially magnetized region of a magnetizable object.

10. The sensor apparatus of claim 9, wherein the circumferentially magnetized region is formed by a first magnetic flow region oriented in a first direction and a second magnetic flow region oriented in a second direction, the first direction being opposite to the second direction.

11. The sensor apparatus of claim 10, wherein, in a cross-sectional view of the magnetizable object, there are (a) a first circular magnetic flow having the first direction and a first radius and (b) a second circular magnetic flow having the second direction and a second radius, the first radius being larger than the second radius.

12. The sensor apparatus of claim 9, wherein the circumferentially magnetized region is manufactured in accordance with the following manufacturing steps: applying a first current pulse to the magnetizable object in a such a manner that there is a first current flow in a first direction along a longitudinal axis of the magnetizable object, the first current pulse being such that the application of the current pulse generates a magnetized region in the magnetizable object.

13. The sensor apparatus of claim 12, wherein a second current pulse is applied to the magnetizable object in such manner that there is a second current flow in a second direction along the longitudinal axis of the magnetizable object.

14. The sensor apparatus of claim 13, wherein each of the first and second current pulses has a raising edge and a falling edge, the raising edge being steeper than the falling edge.

15. The sensor apparatus of claim 13, wherein the first direction is opposite to the second direction.

16. The sensor apparatus of claim 1, wherein the receiver pad includes a plurality of magnetic field detection units.

17. The sensor apparatus of claim 1, wherein the receiver pad includes a plurality of magnetic field detection units, the units being symmetrically arranged.

18. The sensor apparatus of claim 1, wherein the receiver pad includes at least one of a group consisting of a coil; a Hall-effect probe; a Giant Magnetic Resonance magnetic field sensor; and a Magnetic Resonance magnetic field sensor.

19. The sensor apparatus of claim 1, wherein the receiver pad includes a plurality of tiltable coils.

20. The sensor apparatus of claim 1, wherein the receiver pad includes a plurality of coils having a non-concentric winding.

21. The sensor apparatus of claim 1, wherein the receiver pad includes four coils having an essentially circular cross-section and having centers arranged on corners of a square.

22. The sensor apparatus of claim 1, wherein the signal-conditioning and signal-processing electronics is coupled to at least one of the reference device and the receiver pad in at least one of a wireless manner and a wired manner.

23. The sensor apparatus of claim 1, wherein the receiver pad and the reference device are positioned essentially parallel to one another.

24. The sensor apparatus of claim 1, wherein the sensor determines at least one of a one-dimensional position, a two-dimensional position, and a three-dimensional position of the reference device as a function of the magnetic field measured by the receiver pad.

25. The sensor apparatus of claim 1, wherein the sensor is a three-axis linear position sensor apparatus, wherein the electronics determines a three-axis linear position of the reference device as a function of the magnetic field measured by the receiver pad.

26. A washing machine, comprising: the position sensor apparatus of claim 1.

27. The washing machine of claim 26, further comprising: a rotatable drum, wherein the reference device is attached to the rotatable drum.

28. The washing machine of claim 26, wherein the position sensor apparatus measures a position indicative of a weight load of the washing machine.

29. A method for sensing a position of a reference device, comprising: generating a magnetic field by the reference device; measuring, by a receiver pad, the magnetic field generated by the reference device; and determining, by a signal-conditioning and signal-processing electronics, the position of the reference device as a function of the magnetic field measured by the receiver pad, wherein the electronics is operable in (a) a first operation mode in which the electronics is sensitive to a first volumetric space with a first sensitivity and (b) a second operation mode in which the electronics is sensitive to a second volumetric space with a second sensitivity, and wherein the first volumetric space is larger than the second volumetric space, the first sensitivity being smaller than the second sensitivity.

30. A position sensor apparatus, comprising:
a reference device including a magnetic field generating element;
a receiver pad measuring a magnetic field generated by the reference device;
a signal-conditioning and signal-processing electronics determining a position of the reference device as a function of the magnetic field; and
an off-range indicator indicating an operation state in which the reference device is placed outside of a predetermined measurement spacing.

31. A washing machine, comprising:
a position sensor apparatus of claim 30.

32. A method for sensing a position of a reference device, comprising:
generating a magnetic field by the reference device;
measuring, by a receiver pad, the magnetic field generated by the reference device;
determining, by a signal-conditioning and signal-processing electronics, the position of the reference device as a function of the magnetic field measured by the receiver pad; and
indicating, using an off-range indictor, an operation state in which the reference device is placed outside of a predetermined measurement spacing.

* * * * *